July 28, 1942.  E. E. HEWITT  2,290,962
BRAKE AND PROPULSION CONTROL ACTUATOR
Filed Nov. 14, 1940  2 Sheets-Sheet 1
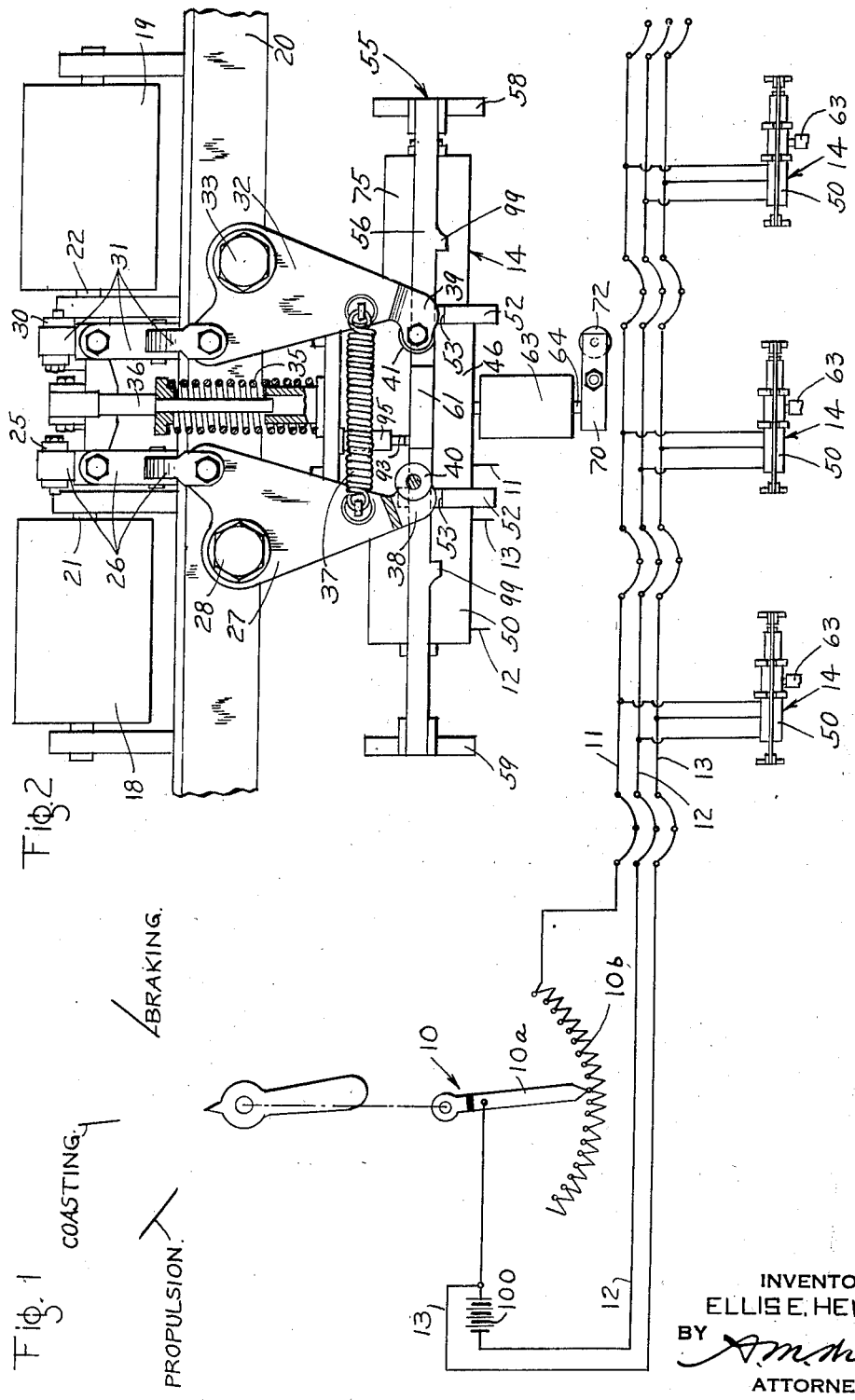
INVENTOR
ELLIS E. HEWITT
BY
ATTORNEY July 28, 1942.                E. E. HEWITT                2,290,962
              BRAKE AND PROPULSION CONTROL ACTUATOR
                   Filed Nov. 14, 1940          2 Sheets-Sheet 2

INVENTOR
ELLIS E. HEWITT
BY
ATTORNEY

Patented July 28, 1942

2,290,962

UNITED STATES PATENT OFFICE 2,290,962

BRAKE AND PROPULSION CONTROL ACTUATOR

Ellis E. Hewitt, Edgewood, Pa., assignor to The Westinghouse Air Brake Company, Wilmerding, Pa., a corporation of Pennsylvania Application November 14, 1940, Serial No. 365,576

19 Claims. (Cl. 192—2)

This invention relates to railway vehicle controlling equipments, and more particularly to a fluid pressure responsive apparatus for controlling both propulsion and braking of a vehicle.

In certain classes of transit service it is the practice to operate trains made up of motor driven vehicles, which are individually equipped with brake controlling means and propulsion controlling means both of which are adapted to respond to operation of a common actuator device, at least one of which is carried by each vehicle. An equipment of this type is disclosed in my U. S. Patent No. 2,215,355 issued September 17, 1940, and comprises fluid pressure responsive means operative in one direction from an intermediate or coasting position for controlling propulsion of the vehicle and in another direction for controlling application of the brakes, together with suitable means responsive to the pressure of fluid in a control pipe, extending throughout the train, for effecting movement of the fluid pressure operated means. With the equipment just described, the propulsion motors and brakes of each vehicle in a train may be actuated in exactly the same increments or steps, with respect to the similar apparatus on each of the other vehicles, under the control of a motorman stationed in the leading vehicle.

The principal object of the present invention is to provide a vehicle brake and propulsion control system having the above features but constructed and arranged for operation entirely by electrical means.

Another object of the invention is to provide an improved propulsion and braking control equipment including an electrically operated actuator device comprising means movable in one direction for operating a propulsion controller and movable in the opposite direction for operating a brake control mechanism, a motor for driving the movable means, and electroresponsive switch means for controlling the motor in accordance with energization of a train wire.

Other objects and advantages of the invention will be apparent in the following detailed description thereof, taken in conjunction with the accompanying drawings, wherein Fig. 1 is a diagrammatic view illustrating a plurality of brake and propulsion control actuator devices embodying the invention and associated in a train equipped with suitable train wires and a control rheostat adapted to be carried on the leading vehicle;

Fig. 2 is a plan view of a brake and propulsion actuator mechanism constructed in accordance with the invention;

Fig. 3 is a vertical elevational view, partly in section, of the electrically operated portion of the actuator mechanism shown in Fig. 2; and Figs. 4 and 5 are fragmentary views illustrating a portion of the switch mechanism shown in Fig. 3.

As shown in Fig. 1 of the drawings, a brake and propulsion control equipment embodying my invention may include a manually operable rheostat controller device 10 which may be carried on the leading vehicle in a train, a control wire 11 and a pair of power supply wires 12 and 13 extending throughout the train, and brake and propulsion control assemblies or actuator devices 14 mounted on the respective vehicles and suitably connected to the train wires. Detailed views of one of the brake and propulsion control assemblies 14 are presented in Figs. 2 and 3 of the drawings.

As shown in Fig. 2 each vehicle is provided with a suitable propulsion controller device 18 and a brake controller device 19, which may be mounted on a frame 20 which is carried by the vehicle body. While the operating parts of these two mechanisms are not illustrated in detail, it will be understood that the propulsion controller device 18 includes suitable circuit controlling mechanism for regulating operation of the usual propulsion motors in accordance with rotation of a shaft 21, and that the brake controller device 19 comprises means operative through the medium of a rotary shaft 22 to control application and release of the usual dynamic, track and fluid pressure, or other forms of, brakes with which the vehicle is equipped. The propulsion controller shaft 21 is operatively connected by suitable rack and pinion means, not shown, to a lever element 25, the upper end of which is connected through the medium of a plurality of links 26 to one arm of a bell crank lever 27 that is journaled on a stationary shaft 28 carried by the frame structure 20. Similarly, the brake controller shaft 22 is adapted to be operated through the medium of a lever 30, a plurality of connected links 31, and a bell crank lever 32 operatively mounted on a shaft 33 carried by the frame structure.

It will be understood that when the bell crank lever 27 is rotated in a clockwise direction about the shaft 28, the links 26, lever 25 and shaft 21 are actuated thereby to effect operation of the propulsion controller device 18 to transmit power to the usual driving motors of the vehicle. When on the other hand the bell crank lever 32 is turned in a counterclockwise direction about the shaft 33, the associated links 31, lever 30 and shaft 22 are operated to actuate the brake controller device 19, thereby effecting an application of the brakes. Both of the bell crank levers 27 and 32 are normally urged toward their inoperative or coasting positions, as shown in Fig. 2, under the force exerted by a coil spring 35, which acts through the medium of a plunger 36 and other suitable elements not shown in detail to apply a biasing force to the levers 25 and 30. In addition, a tension spring 37 is provided for resisting movement of either of the bell crank levers 27 and 32 out of their normal positions, the opposite ends of this spring being connected to lugs carried by the respective levers.

The two bell crank levers 27 and 32 are operatively aligned within the same plane, and have formed on the free ends thereof clevis portions 38 and 39, respectively. Mounted in the clevis portion 38 is a roller 40 which is disposed in spaced relation with a similar roller 41 carried by the clevis portion 39.

Referring to Fig. 3 of the drawings, the actuator mechanism 14 further comprises a frame member 45, which is substantially vertically disposed and may form a part of the frame structure 20. The frame member 45 is adapted to carry a substantially cylindrical member 46, which may be secured to the frame member by suitable means such as bolts, not shown, and is horizontally disposed below the rollers 40 and 41 carried by the bell crank levers 27 and 32. One end of the cylindrical member 46 is provided with a reduced neck portion 48 having a bore 49, adjacent to which is disposed a suitably insulated magnet coil 50, which may be mounted on the cylindrical member in any desired manner. Formed on each end of the cylindrical member 46 is one of a pair of annular flanges 52 (see Fig. 2), in each of which flanges are formed upper and lower guide channels 53.

Operably mounted on the cylindrical member 46 is a movable frame assembly 55 comprising a pair of horizontally disposed guide bars 56 and 57, which are arranged in sliding relation with the upper and lower guide channels 53, respectively, and cross head members 58 and 59, each of which is secured by means of bolts 60 to adjacent end portions of the guide bars 56 and 57. A cam member 61 is bolted or otherwise secured to the guide bar 56. It will be noted that the guide bars 56 and 57 are spaced apart a sufficient distance to clear the magnet coil 50 carried by the cylindrical member 46.

For driving the movable frame backward and forward during operation of the equipment as hereinafter explained, there is provided an electric motor 62, which is illustrated in diagrammatic form as comprising an armature winding 63 mounted on a shaft 64, and a field winding 65. One end of the armature shaft 64 has keyed thereon a pinion 66, the teeth of which engage corresponding teeth formed on a central rack portion 67 of the guide bar 57. The opposite end of the motor shaft 64 is provided with a hub portion 69 around which is operatively mounted a brake band 70 that is arranged to be moved under the pressure of a coil spring 71 into braking relation with the hub member. An electric magnet 72 is operatively associated with the outer ends of the brake band 70 and is operative when energized as hereinafter explained, to hold the brake band in release position against the force of the spring 71.

A cylindrical spring guide member 75 is disposed between the guide bars 56 and 57 with one end thereof slidably engaging the inner surface of the cylindrical member 46, while the outer end thereof is held in spaced relation with the cross head member 58 through the medium of an adjustable bolt 76, which is secured to the spring guide member and is adapted to engage the cross head member. Operatively mounted within the cylindrical member 46 between the end wall thereof and the spring guide member 75 is a switch carrier element 78, comprising a hollow central portion having a sleeve portion 79 formed at one side thereof and slidably disposed in the open end of the spring guide member 75, and having formed on the opposite end thereof a rod 80, which extends through the bore 49 of the stationary cylindrical member 46. Secured to the outer end of the rod 80 is a core piece 81 which is arranged to respond to magnetic force exerted upon energization of the magnet coil 50. The core piece 81 is preferably suitably threaded so that it may be screwed on to the correspondingly threaded end of the rod 80 and locked in the desired position thereon by means of a lock nut 83. A coil spring 85 is interposed between the end wall of the spring guide member 75 and the switch carrier element 78 for opposing movement thereof under the force exerted on the core piece 81 by the magnet coil 50, as hereinafter explained.

The hollow central portion of the switch carrier element 78 has secured therein a pair of oppositely disposed insulating blocks 86 and 87, on which are mounted a plurality of switch contact elements hereinafter described. These contact elements are arranged to be moved into and out of engagement with a plurality of spring contact clips which are secured to central carrier arm or post 90, which is made of a suitable insulating material and has its lower end attached to the stationary cylindrical member 46. As will hereinafter be explained in detail, the switch carrier element 78 is constructed and arranged to be balanced in an intermediate or circuit opening position as shown in Fig. 3, wherein the contact elements carried by both the insulating blocks 86 and 87 are held out of engagement with the contact elements supported by the post 90, although during operation of the equipment either set of the movable contact elements may be brought into engagement with the central stationary contact elements, according to the direction in which the contact or switch carrier element 78 is shifted.

In order to ensure movement of the switch carrier element 78 to its intermediate position when the magnet coil 50 is completely deenergized, there is provided a shifting lever 93, which is hung from a pin 94 carried by a post 95 extending laterally from the frame member 45, and which has its lower portion suitably formed to extend through an aperture in the cylindrical member 46 and into a recess 97 formed in the switch carrier element 78. A lug 98 is secured to the guide bar 56 on the side thereof adjacent the lever 93 and is so located that, upon full movement of the movable frame 55 to the right, as viewed in Fig. 3, the lug will be brought into operative engagement with the lever 93 for effecting movement of the carrier element 78 in the same direction to its circuit opening position.

It will be noted that suitable stop elements 99 are carried by the respective guide bars 56 and 57 for preventing excessive movement thereof in either direction out of the normal or coasting position illustrated in Figs. 2 and 3.

*Operation*

Operation of the single brake and propulsion actuator device 14 shown in Figs. 2 and 3 will now be described in detail, it being understood that all of the actuator devices 14 on the separate vehicles in the train illustrated in Fig. 1 are effected simultaneously and in the same manner, in accordance with manipulation of the rheostat controller device 10 on the leading vehicle.

With the rheostat controller 10 disposed in coasting position as shown in Fig. 1, a movable contact arm 10a thereof is held in a substantially midway position with respect to a resistance 10b so that a predetermined normal flow of current is maintained through a circuit including the positive terminal of a battery 100, the contact arm and resistance just mentioned, the train wire 11, the magnet coil 50 of the actuator device 14, the return train wire 12, and the negative terminal of the battery.

Referring to Fig. 3, with the magnet coil 50 thus partially energized by the supply of current thereto at a normal value, a magnetic force is exerted thereby on the core 81 tending to urge that element and the switch carrier element 78 to the right with a force balancing that exerted in the opposite direction by the coil spring 85, while the two sets of contact elements carried by the insulating blocks 86 and 87 are substantially equally spaced from the central contact elements on the post 90. It will be understood that the electric motor 62 is thus deenergized, and that the auxiliary brake magnet 72 is likewise deenergized for permitting the spring 71 to maintain the brake band 70 in braking relation with the motor shaft 69. The movable frame 55 is also held in coasting position with the cam member 61 thus disposed substantially midway between the rollers 40 and 41 carried by the respective bell crank levers 37 and 32. The propulsion controller device 18 and the brake controller device 19, shown in Fig. 2, are consequently maintained in their inoperative or coasting positions, wherein the vehicle driving motors are deenergized while the brakes are released.

When the motorman operates the rheostat controller device 10 shown in Fig. 1 to effect propulsion of the train, the rheostat contact arm 10a is actuated to cut out a predetermined amount of the resistance 10b from the circuit including the train wire 11, so that a greater current is supplied through that circuit. Referring again to Fig. 3, upon the increase in the current supplied by way of the train wire 11 through the magnet coil 50 and the return train wire 12 of the circuit hereinbefore traced, the magnet coil becomes energized to a greater degree and exerts a force on the core element 81 sufficient to shift the switch carrier element 78 to the right against the opposing pressure of the spring 85. When the switch carrier element 78 is thus moved under the increased force exerted by the magnet coil 50, a contact element 105 mounted on the insulating block 86 is brought into bridging relation with three contact elements 106, 107 and 108 mounted on the stationary post 90, while another contact element 110 carried by the insulating block is brought into bridging relation with contact elements 111 and 112 mounted on said post, thereby setting up circuits for energizing the electric motor 62 and the magnet coil 72 of the motor brake device. The circuit through which the motor 62 becomes energized includes the wire 13 leading from the battery previously described, the contact element 107, contact element 105, contact element 106, a conductor 115, the motor armature winding 63, a conductor 116, the connected contact elements 111, 110 and 112, the motor field winding 65, a conductor 117, and the train wire 12 leading to the negative terminal of the battery. The closed circuit for the magnet core 72 includes the train wire 13, the connected contact switch elements 107, 105 and 108, a conductor 119, the coil 72, and the conductor 117 connected by means of the train wire 12 to the battery.

With the motor magnet 72 thus energized, the brake band 70 is held in its released position against the force of the spring 71, while the motor 62 is rendered operative to rotate the pinion 66 in a counterclockwise direction for shifting the movable frame 55 toward the left, as viewed in Fig. 3.

Referring to Fig. 2 of the drawings, it will be seen that the movable frame 56 when moved in the left-hand direction carries with it the cam member 61, which is quickly brought into engagement with the roller 40 for effecting clockwise rotation of the bell crank lever 27 about the shaft 28. In so moving, the bell crank lever 27 acts through the medium of the links 26 and lever 25 to actuate the propulsion controller device 18 to supply power to the driving motors of the vehicle.

As the movable frame 55 is shifted for initiating operation of the propulsion controller as just explained, the coil spring 85 shown in Fig. 3 is gradually compressed due to inward movement of the spring guide member 75, so that an increasing force is applied to the switch carrier element 78 in opposition to the force exerted thereon through the medium of the magnet coil 50. When the movable frame 55 has been moved far enough to cause the pressure exerted by the spring 85 to balance or to slightly exceed that produced by the magnet coil 50, the switch carrier element 78 is returned to its intermediate or circuit opening position, wherein contact between the contact elements 105 and 110 and the contact elements carried by the post 90 is broken. The motor 62 is thus deenergized for halting further movement of the movable frame 55, while the magnet coil 72 is also deenergized to permit application of the brake band 70 to prevent accidental rotation of the motor shaft 64.

It will be apparent that the actuator device 14 is thus operative to position the propulsion controller device in accordance with the predetermined current supplied to the magnet coil 50 as a result of operation of the motorman's rheostat controller device on the leading vehicle. It will be evident that if the rheostat controller device is further moved to effect an increased flow of current to the magnet coil 50, the switch mechanism of the actuator device 14 will be again operated in the manner already described to cause additional movement of the movable frame 55 to the left, thus causing movement of the associated propulsion controller device resulting in a corresponding increase in the energization of the vehicle driving motors, until the desired rate of propulsion is attained.

When it is desired to cut off the supply of power to the propulsion motors, the rheostat controller device 10 shown in Fig. 1 is moved to coasting position, so that the current flowing through the magnet coil 50 of each of the actuator devices 14 is reduced to the normal value previously referred to. As the magnetic force produced by the magnet coil 50 and acting on the core element 81 shown in Fig. 3 is thus reduced to the normal value, the spring 85 becomes effective to shift the switch carrier element 78 to the left, since the spring has meanwhile been held a compressed position due to the positioning of the movable frame 55 as just explained.

Upon such movement of the switch carrier element 78 by the force of the spring 85, three contact elements 120, 121 and 122 carried by the insulating block 87 are brought into engagement with the several contact elements carried by the post 90 in such a manner as to establish circuits for again energizing the motor brake coil 72 and the motor 62, the latter being this time adapted for operation in a reversed direction. The motor circuit just mentioned includes the train wire 13, switch contact elements 107, 121 and 111, the conductor 116, the armature winding 63, conductor 115, conductors 106 and 120, a conductor 123 carried by the insulating block 87, contact elements 122 and 112, the motor field winding 65, conductor 117, and train wire 12, which is of course connected to the battery. The circuit through which the magnet coil 72 is energized is the same as that already described in connection with the initial operation of the actuator device in causing propulsion of the vehicle.

The motor 62 is thus energized for effecting rotation of the shaft 64 and pinion 66 in a clockwise direction, as viewed in Fig. 3, so that the movable frame 55 is shifted to the right, thus permitting the coil spring 85 to expand somewhat for reducing the force exerted thereby against the switch carrier element 78. This movement of the movable frame 55 by operation of the motor 62 is continued until the force of the spring 85 becomes slightly less than the opposing force applied to the element 78 by the magnet coil 50, whereupon the switch carrier element is quickly moved toward the right and into its circuit opening position, as shown in Fig. 3. The various elements of the actuator device 14 are then again held in the coasting position as hereinbefore explained.

It will be understood that the reduction in the amount of power supplied to the driving motors may, if desired, be accomplished in increments or steps rather than in one operation such as just described, and the actuator device 14 will of course respond at any time to an increase in the current supplied to the magnet coil 50 for again causing movement of the associated propulsion controller device toward its full propulsion position.

If it is desired to effect an application of the brakes, the rheostat controller device 10 shown in Fig. 1 is operated to effect a reduction in the current supplied through the train wire circuit in which the several magnet coils 50 are connected, the energizing current in such case being reduced below the normal value supplied to the circuit, in accordance with the desired degree of application of the brakes. Assuming that the actuator device 14 is initially disposed in coasting position as shown in Fig. 3 of the drawings, the predetermined reduction in the value of current supplied by way of train wires 11 and 12 to the magnet coil 50 causes a corresponding release of magnetic force reacting on the core element 81, with the result that the force exerted by the spring 85 is rendered effective to shift the switch carrier element 78 to the left for bringing the switch contact elements carried by the insulating block 87 into engagement with the central contact elements carried by the post 90. The circuits already described are thus again closed for effecting release of the brake band 70 out of braking relation with the motor shaft, while the motor 62 is operated to rotate the pinion 66 in a clockwise direction, thereby shifting the movable frame 55 in a right-hand direction. The cam element 61 is thus brought into engagement with the roller 41 carried by the bell crank lever 32. Referring to Fig. 2, the bell crank lever 32 is then rotated in a counterclockwise direction about the shaft 33, as the movable frame 55 continues its movement, with the result that the link elements 31 and lever 30 are accordingly actuated to operate the brake controller device 19 for effecting the desired application of the brakes.

It will be understood that, as already explained in connection with the operation of the actuator mechanism in controlling the propulsion motors, each of the actuator mechanisms 14 in the train is adapted to effect application of the associated brakes with substantially the same degree of force, and simultaneously with operation of the other actuator mechanisms throughout the train. It will further be apparent that the motorman can graduate the application of the brakes as desired by varying the amount of electric current flowing through the train wire circuit, thereby effecting corresponding movement of each of the brake and propulsion control actuator mechanisms in the manner just explained.

When it is desired to effect the release of the brakes, the current supplied through the circuit including the magnet coil 50 of the actuator mechanism is restored to the predetermined normal value, thereby effecting operation of the movable parts of the mechanism to the coasting position in the manner hereinbefore explained.

From the foregoing description it will be apparent that a brake and propulsion control system including the actuator device designed in accordance with the invention is constructed and arranged to be governed entirely by electrical means, and is readily adapted to provide sensitive and accurate control of any number of motor driven vehicles connected in a train, each actuator mechanism thereof being operable in accordance with the energization of a train circuit to actuate the usual brake and propulsion controllers associated therewith in the exact manner predetermined by the motorman operating the controller in the leading vehicle.

While one illustrated embodiment of the invention has been described in detail, it is not intended to limit its scope to that embodiment or otherwise than by the terms of the appended claims.

Having now described my invention, what I claim as new and desire to secure by Letters Patent, is:

1. In a vehicle of the class having propulsion controller means, brake controller means, and a source of electrical power, in combination, a train circuit adapted normally to be energized with a predetermined current, means operable to vary the value of current flowing through said circuit above and below said normal value, an actuator device comprising movable means operative for actuating either of said controller means, electric motor means operatively connected to said movable means, and electroresponsive means operative in accordance with variations in the current in said circuit for controlling said motor means.

2. In a vehicle of the class having propulsion controller means and brake controller means, in combination, an electric circuit adapted to be energized with current normally maintained at a predetermined value, means operative to vary the flow of current in said circuit above and below said predetermined value, and an electroresponsive actuator device operative in accordance with variations in the current in said circuit to actuate either said propulsion controller means or said brake controller means.

3. In a vehicle of the class having propulsion controller means, brake controller means, and a source of electric current, in combination, a circuit adapted to be energized with current normally maintained at a predetermined value, means operative to increase and decrease the value of the current in said circuit, and an electroresponsive actuator device comprising movable means cooperative with both the propulsion and brake controller means, motor means for operating said movable means, and switch means operative according to variations in the value of current in said circuit for controlling operation of said motor means.

4. In a vehicle brake and propulsion control equipment; a first lever means operable for effecting application of the brakes to various degrees, a second lever means operable for controlling propulsion of the vehicle, yielding means normally urging both of said lever means toward a neutral position wherein the brakes are released while the power for propulsion is cut off, and an actuator device comprising a movable member having a normal position from which said member is shiftable in one direction for operating the first lever means and in another direction for operating the second lever means, motor means for operating said movable member in either direction, and automatic switch means operative to control operation of said motor means.

5. In a brake and propulsion control system for a train of vehicles of the class involving brake means and propulsion means mounted on each vehicle, in combination, a normally energized electric circuit extending throughout the train, rheostat means carried on at least one of the vehicles for varying the value of current in said circuit above and below a predetermined normal value, and an actuator device for each vehicle comprising a movable member having a coasting position from which said member is shiftable in one direction for controlling operation of the propulsion means and in the opposite direction for controlling application of the brakes of that vehicle, an electric motor for operating said movable member, switch means for effecting operation of said motor in either direction, and means automatically operative to control said switch means in accordance with variations in the current in said circuit.

6. In a brake and propulsion control system for a train of vehicles of the class involving brake means and propulsion means for each vehicle, in combination, a normally energized control circuit extending throughout the train, rheostat means carried on at least one of the vehicles for varying the flow of current in said control circuit above and below a predetermined normal value, and an actuator device for each vehicle comprising a movable member having a coasting position from which said member is shiftable in one direction for controlling operation of the propulsion means and in the opposite direction for controlling application of the brakes of the associated vehicle, reversible motor means for driving said movable member in said direction, and electroresponsive switch means automatically governed according to each increase or decrease in current in said control circuit for effecting correspondingly directed operation of said motor means for an interval proportional to the degree of the variation in current.

7. In a brake and propulsion control system for a train of vehicles of the class involving brake means and propulsion means for each vehicle, in combination, a normally energized control circuit extending throughout the train, current controlling means carried on at least one of the vehicles for varying the value of current in said circuit above and below a predetermined normal value, and a control assembly on each vehicle comprising a brake controller mechanism, a propulsion controller mechanism, and electroresponsive actuator means operatively associated therewith and automatically movable in accordance with each increase in the current in said circuit above said normal value to operate said propulsion control mechanism, and in accordance with each reduction in said current below said normal value to operate said brake controller mechanism.

8. In a brake and propulsion control system for a train of vehicles of the class involving brake means and propulsion means for each vehicle, in combination, a normally energized control circuit extending throughout the train, current controlling means carried on at least one of the vehicles for varying the flow of current in said circuit above and below a predetermined normal value, and a control equipment for each vehicle comprising a brake controller mechanism, a propulsion controller mechanism, electroresponsive actuator means operatively associated therewith and responsive to the current flowing in said control circuit, said actuator means being arranged to effect movement of said propulsion controller mechanism proportional to each increase in the value of said current above said normal value and to effect movement of said brake controlling mechanism proportional to each reduction in the value of said current below said predetermined value, and means for normally holding said actuator means in a coasting position wherein both the propulsion controller mechanism and the brake controller mechanism are maintained inoperative.

9. In a brake and propulsion control system for a vehicle of the class equipped with brake means and propulsion means, in combination, a control circuit normally energized by current at a predetermined value, control rheostat means operable for varying the value of current in said circuit above and below said normal value, and a control assembly comprising a brake controller mechanism, a propulsion controller mechanism, and electroresponsive actuator means operatively associated therewith and automatically movable in accordance with each increase in the strength of current in said control circuit above said normal value to operate said propulsion control mechanism, and responsive to each reduction in the strength of said current below said normal value to effect corresponding operation of said brake controller mechanism.

10. A vehicle brake and propulsion control actuator device comprising an operating element having a coasting position and movable therefrom in one direction for controlling propulsion and in the opposite direction for controlling braking, an electric motor for driving said movable element in either direction, reversing switch means for said motor, a spring, an electromagnet variably energized by means of a control current, and means subject to the opposing forces exerted by said spring and by said electromagnet for operating said switch means.

11. A vehicle braking and propulsion control equipment comprising actuator means movable in one direction to various positions for initiating propulsion of the vehicle and movable in the other direction to different positions for effecting application of the vehicle brakes, an electric motor operatively connected to said actuator means, reversing switch means automatically operable to control operation of said electric motor in either direction, and brake means associated with the said motor and controlled by said switch means for holding said actuator means in any position to which it has been moved by said motor.

12. A vehicle braking and propulsion control equipment comprising actuator means movable in one direction for initiating propulsion of the vehicle and movable in the other direction for effecting application of the vehicle brakes, an electric motor operatively connected to said actuator means, reversing switch means automatically operable to control operation of said electric motor in either direction, and electroresponsive brake means controlled by said switch means and rendered operative thereby, when said motor is deenergized, for preventing accidental movement of said actuator means.

13. In a vehicle brake and propulsion control equipment, in combination, a brake controller, a propulsion controller, a movable actuator member having a normal coasting position and movable therefrom in one direction for operating said brake controller and in the other direction for operating said propulsion controller, a reversible motor operably connected with said actuator member, a spring arranged to be variably tensioned by said actuator member, an electromagnet variably energized by current in a control circuit, and switch means interposed between said spring and said electromagnet and operable thereby for controlling said motor.

14. In a vehicle brake and propulsion control equipment, in combination, a brake controller, a propulsion controller, a movable actuator member having a normal coasting position and movable therefrom in one direction for operating said brake controller and in the other direction for operating said propulsion controller, a reversible motor operably connected with said actuator member, a spring arranged to be variably tensioned by said actuator member, an electromagnet variably energized by current in a control circuit, and switch means subject to opposing forces exerted by said spring and by said electromagnet, said switch means being positioned to deenergize said motor when said opposing forces are balanced, and being shiftable in either direction to a circuit closing position in response to a change in one of said forces for effecting correspondingly directed operation of said motor.

15. In a vehicle brake and propulsion control equipment, in combination, a brake controller, a propulsion controller, a movable actuator member having a normal coasting position and movable therefrom in one direction for operating said brake controller and in the other direction for operating said propulsion controller, a reversible motor operably connected with said actuator member, a spring arranged to be variably tensioned by said actuator member, an electromagnet variably energized by current in a control circuit, and a switch mechanism jointly controlled by said spring and said electromagnet, said switch mechanism being responsive to a preponderant force exerted by said electromagnet for causing said motor and actuator member to move in the direction for operating said propulsion controller, and being responsive to a preponderant force exerted by said spring to cause said motor and actuator member to move in the opposite direction, whereby in the event of loss of current in said control circuit the actuator member is rendered effective to cause application of the brakes.

16. In a vehicle brake and propulsion control equipment, in combination, a brake controller, a propulsion controller, a movable actuator member having a normal coasting position and movable therefrom in one direction for operating said brake controller and in the other direction for operating said propulsion controller, a reversible motor operably connected with said actuator member, a spring arranged to be variably tensioned by said actuator member, an electromagnet variably energized by current in a control circuit, switch means operatively interposed between said spring and said electromagnet and operative to control energization of said motor, and means for ensuring movement of said switch means to deenergize said motor upon movement of said actuator member to its extreme brake application position.

17. In a vehicle of the class having propulsion controller means, brake controller means, and a source of electric current, in combination, a circuit adapted to be energized with current normally maintained at a predetermined value, means operative to increase and decrease the value of the current in said circuit, and an electroresponsive actuator device comprising a stationary supporting structure, a movable member slidably mounted thereon and having a neutral position from which said member is shiftable in one direction for operating said propulsion controller means and in another direction for operating said brake controller means, an electric motor operatively connected with said movable member, an electromagnet carried by said supporting structure and adapted to be variably energized by current in said circuit, reversing switch means controlling operation of said motor and including a contact carrier arranged for limited movement in opposite directions along with said movable member, a core element extending from one side of said contact carrier into cooperative relation with said electromagnet, and a spring interposed between the opposite side of said contact carrier and said movable member.

18. In a vehicle of the class having propulsion controller means, brake controller means, and a source of electric current, in combination, a circuit adapted to be energized with current normally maintained at a predetermined value, means operative to increase and decrease the value of the current in said circuit, and an electroresponsive actuator device comprising a stationary supporting structure, a movable member slidably mounted thereon and having a neutral position from which said member is shiftable in one direction for operating said propulsion controller means and in another direction for operating said brake controller means, an electric motor operatively connected with said movable member, reversing switch means having propulsion, neutral, and braking positions and operable to control starting and stopping of said motor, electromagnetic means responsive to current in said circuit for urging said switch means toward its propulsion position, and spring means opposing said magnetic means for urging said switch means toward its braking position, said spring means being arranged to be variably compressed according to the positioning of said movable member.

19. A vehicle brake and propulsion control actuator device comprising an operating element having a coasting position and movable therefrom in one direction for controlling propulsion and in the opposite direction for controlling braking, an electric motor for driving said movable element in either direction, and mechanism for controlling starting and stopping of said motor including a stationary contact element, a movable switch member having a plurality of contact elements respectively cooperable with said stationary contact element to effect forward, stop, and reverse operations of said motor, a spring yieldingly connecting said motor driven operating element to said movable switch member, and an electromagnet constructed and arranged to exert a variable force upon said movable switch element opposing that of said spring.

ELLIS E. HEWITT.